Patented Jan. 28, 1936

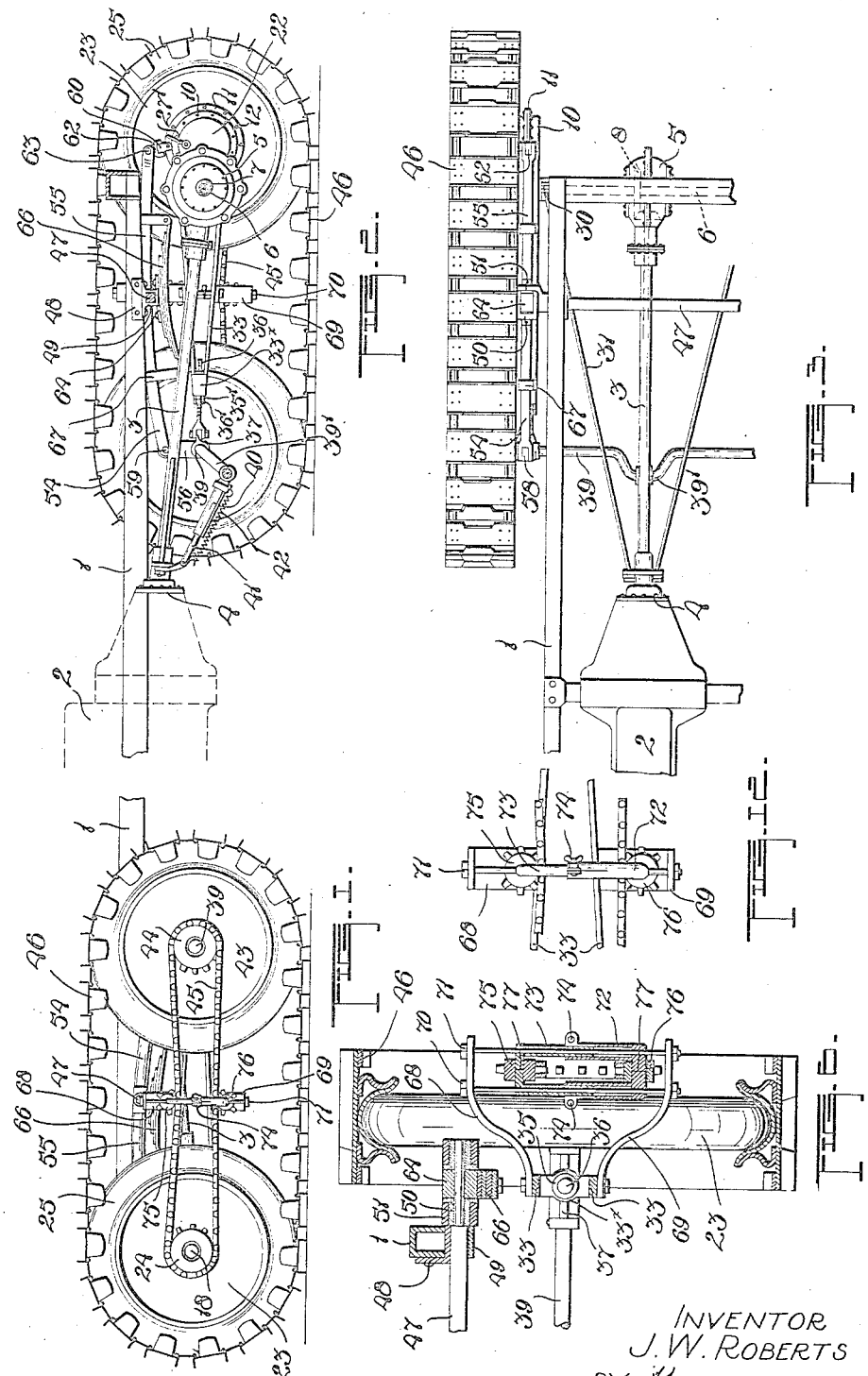

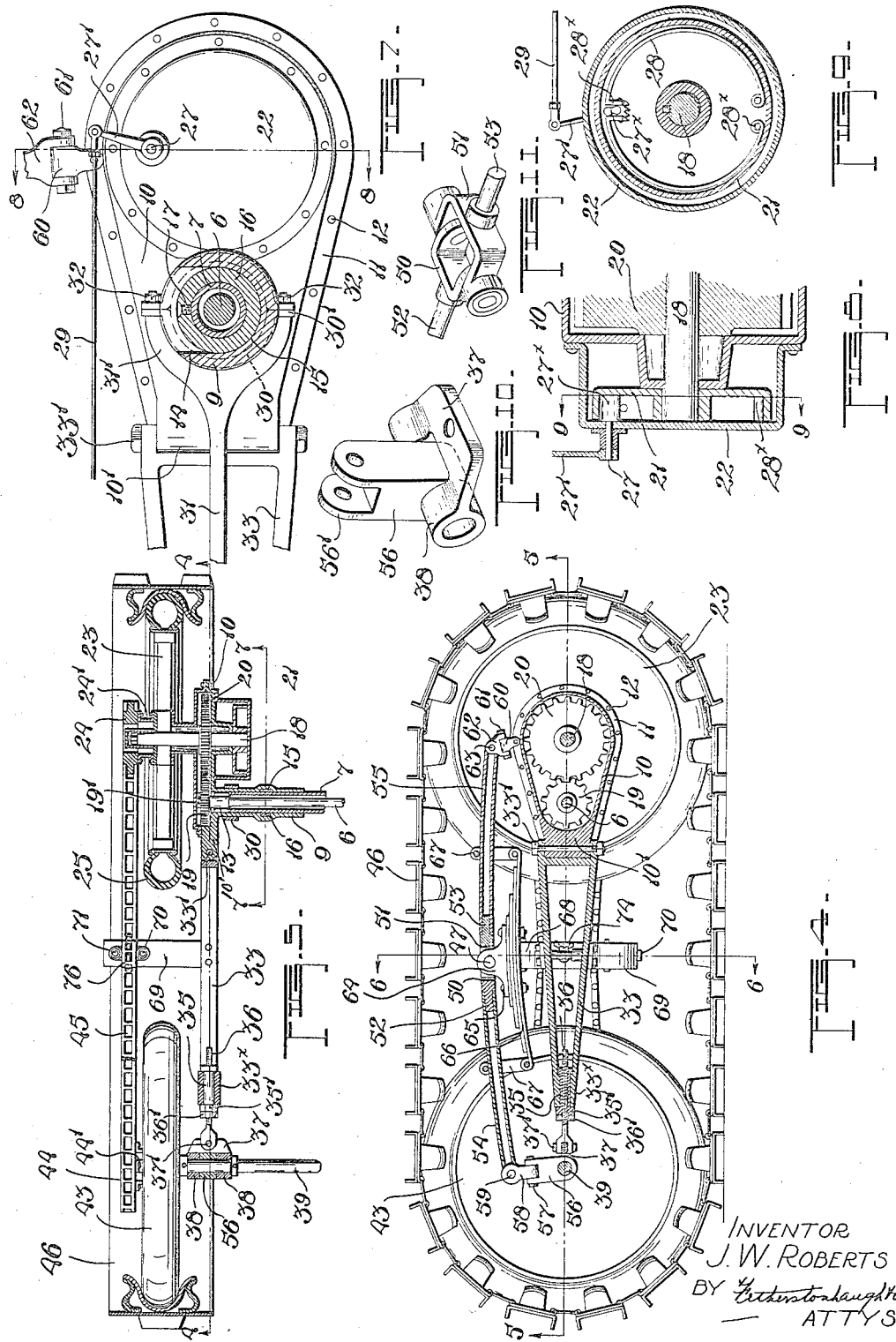

2,029,196

UNITED STATES PATENT OFFICE 2,029,196

MOTOR SLEIGH

Joseph W. Roberts, Portage la Prairie, Manitoba, Canada

Application February 15, 1934, Serial No. 711,410

2 Claims. (Cl. 180—5)

The invention relates to improvements in automobile sleighs and an object of the invention is to provide a device for operating on snow or ice and which is arranged to give a particularly large traction tread in contact with the road surface which prevents the sinking of the vehicle and insures also of the effective propulsion of the same, the present invention being in reality an improvement in the type of automobile sleigh previously invented by me and fully set forth and described in my prior Patent No. 1,850,691 issued March 22, 1932.

A further object is to construct the device so that it can be readily applied on the existing type of automobile chassis without requiring extensive alteration in the same and such that the parts provided can be readily assembled and will permit of the free movement of the road wheels to accommodate road conditions and further to provide means for reducing the speed of travel of the rear road wheel and for positively driving the front road wheel from the rear wheel, such embodying a driving chain connecting the same.

A further object is to provide spacing arms between the front and rear axles which can be adjusted as desired to properly align the axles and which are also flexible to permit of the relative movement of the axles due to road irregularities.

A further object is to provide a tightener taking up any slack which may occur in the driving chain.

A further object is to construct a new and novel means for applying brakes on the rear wheels and which is readily operated by the driver in the usual manner.

A further object is to provide a construction which permits the driving wheels to be located in a more forward position than disclosed in my prior application.

With the above more important and other minor objects in view which become more apparent as the description proceeds, the invention consists essentially in the arrangement and construction of parts hereinafter more particularly described, reference being had to the accompanying drawings, in which:—

Fig. 1 is a side view from the exterior showing the device.

Fig. 2 is an interior view of the parts appearing in Figure 1, certain other parts being shown in vertical section.

Fig. 3 is a plan view of the parts appearing in Figure 2.

Fig. 4 is a vertical sectional view at 4—4 Figure 5 viewing Figure 1 from the interior.

Fig. 5 is a horizontal sectional view at 5—5 Figure 4, certain parts being shown in plan.

Fig. 6 is an enlarged detailed vertical sectional view at 6—6 Figure 4.

Fig. 7 is an enlarged detailed vertical sectional view at 7—7 Figure 5.

Fig. 8 is a vertical sectional view at 8—8 Figure 7.

Fig. 9 is a vertical sectional view at 9—9 Fig. 8.

Figs. 10 and 11 are perspective views showing certain details of construction.

Fig. 12 is an enlarged view of another detail of construction.

In the drawings like characters of reference indicate corresponding parts in the several figures.

In carrying out my invention, I utilize the customary automobile frame 1 which carries forwardly the internal combustion engine 2, the engine driving the propeller or drive shaft contained in the shaft housing 3. This housing extends customarily angularly rearwardly and downwardly from the rear end of the engine transmission case being connected thereto by the universal joint 4. The rear end of the propeller shaft enters the customary differential gear housing 5 containing the customary differential gears utilized to drive the usual rear axle 6 contained in the rear axle housing 7.

The customary automobile having the parts already described has the differential gears in the housing arranged so that the propeller shaft drives the rear axles in a forward direction.

According to my invention, however, and herein disclosed in detail, I desire that the rear axles be driven in the reverse direction to that just mentioned and this is accomplished by reversing the position of the customary crown gear 8 of the differential drive as best shown in Figure 3. Ordinarily this crown gear is to the left hand side of the driving gear at the rear end of the drive shaft whereas in my case, it is placed to the right hand side of the driving gear as shown in Figure 3. The axle housings usually terminate at their outer ends in enlarged heads but according to my invention, as I do not require these heads, I cut them off so that the axle housings terminate somewhat in from the outer ends of the axles.

On the end of each axle housing, I mount rotatably a sleeve 9 which is located on the inner side of a vertically split two-part gear casing 10, the inner and outer parts of the gear casing being provided with mating flanges 11 fastened together by bolts 12. The outer end of the sleeve is fitted with roller bearings 13 carrying rotatably the extending end of the axle 6 and in a location substantially midway of its length, the sleeve is provided with a top slot 14 which opens to a channel 15 provided in the interior wall of the sleeve, the arrangement being such that a circular collar 16 can be dropped into the channel of the sleeve through the slot prior to the sleeve being placed on the axle housing and then subsequently the collar can be secured to the housing which it receives by manipulating the jam screw 17 carried by the collar, the jam screw being approached through the slot 14. According to this arrangement, the sleeve is free to rotate around the axle housing and is prevented from end shifting movement thereon by the fixed collar 16.

The gear casing is provided rearwardly with opposing bearings which receives rotatably the rear wheel shaft 18, it being observed that the ends of the shaft project both inwardly and outwardly beyond the bearing. To the outer end of each rear axle, I fasten in the usual manner by a jam nut 19', a pinion 19 and this pinion meshes continuously with a gear wheel 20 secured to the wheel shaft 18, the ratio being two to one. By employing the gear and pinion as shown, it will be clear why I reverse the position of the crown gear 8 previously mentioned.

To the inner end of the shaft 18, I secure permanently a brake drum 21 and this is enclosed within a brake drum casing 22 secured to the gear casing. The gear casing in actual practice will be filled with grease to effectively lubricate the gear and pinion and associated parts. On the outer end of the shaft 18, I mount the rear wheel 23 which is of the usual type, the said wheel turning with the shaft 18. To the hub portion of the wheel, I secure a number of similar spaced brackets 24' which support an open centered chain wheel 24, the said chain wheel being mounted concentric to the shaft 18. The wheel is provided with the conventional inflated tire and casing indicated generally by the reference numeral 25.

The brake drum casing carries rotatably a short spindle 27 provided with a crank 27' and a braking head 27$^x$, the head being of the shape best shown in Figure 9 and being entered between the down turned upper ends 28' of the internal brake bands 28 which have their lower ends pivotally attached at 28$^x$ to the brake drum casing.

An actuating rod 29 is pivotally secured to the crank and extends forwardly for operating purposes in the well known manner and the arrangement is such that one can apply the brakes on the rear wheels by pulling the rods 29 forwardly to cause the spreading or expanding of the brake bands against the drums by the turning of the heads 27$^x$.

The outer end of each sleeve 9 is circumferentially channeled to receive a pair of bands 30 having out turned mating lugs 30' only one of these bands being shown in Figures 3 and 7 of the drawings accompanying this application and in conjunction with these bands, I utilize similar radius rods 31 which have their rear ends forked as indicated at 31' to span the front band and the rear ends of the forks threaded to pass through the lugs to which they are fastened by applied nuts 32. Actually when the nuts are tightened up, the bands are held firmly together around the sleeve and the rear ends of the radius rods are secured to the bands. The front ends of the radius rods are fastened in the usual manner to the forward end of the propeller shaft housing, there being the well known adjustable connection at this point so that the radius rods can be tightened up from time to time as occasion demands.

The forward end of each gear casing 10 is provided with an integrally cast head 10' and to such head, I pivotally connect by a vertical pivot bolt 33', the rear end of a forwardly extending spacing arm 33 which is provided at its front end with a forward bearing sleeve 33$^x$ which receives freely an inner sleeve 35 having a nut like head 35' at its forward end and engaging the forward end of the bearing sleeve.

The inner sleeve 35 is internally screw threaded to receive the screw threaded adjusting bolt 36 which is provided with a lock nut 36' and has the forward end thereof spanning a U-shaped coupling bar 37 to which it is connected by a pivot bolt 37', the bar being supplied with bearing sleeves 38 receiving the outer end of the forward stationary front wheel axle 39.

Centrally the latter axle is provided with a crank 39' to clear the propeller shaft should said cranked shaft rise and in order to hold the shaft 39 in a relatively fixed position, I have pivotally connected to it centrally a tube 40 which telescopically receives the rear end of a rod 41, the forward end of the rod being pivotally connected in any suitable manner to the forward end of the propeller shaft housing. The forward end of the rod and the rear end of the tube are supplied with hooks which carry the ends of a coiled spring 42. The coiled spring is normally in tension and at such time, the rear end of the rod is engaging the closed rear end of the tube. Should the cranked shaft strike an obstruction on the road, the spring will extend and will then return the parts to the original positions after the obstruction is passed.

On the outer ends of the shaft 39, I mount rotatably in each instance a front wheel 43 which is similar to that 23 already described. The front wheel is supplied with suitable spaced brackets 44' which carry a forward chain wheel 44 and this chain wheel is connected to the rear chain wheel 24 by an endless driving chain 45. According to the above arrangement, it will be seen that both wheels are positively driven, the front and the rear wheel are connected in each instance by the chain 46 the tread of which is of the same construction as that described in my prior application patent hereinbefore referred to and the details of which form no part of the present invention.

In a location more or less centrally between the front and rear wheels, I locate a supporting cross shaft 47 which underlies the side portions of the main frame 1 and is permanently secured to said side portions of such frame in any suitable manner. I have herein shown the said latter shaft as having the body part thereof square in cross section and with the ends thereof circular in cross section and the body of the shaft is fastened to the frame by employing short angle bars 48 fixed to the frame and clamps 49 bolted to the bars and receiving the square body of the shaft.

On the circular ends of the cross shaft 47, I mount pivotally fork shaped spanners 50 and 51 (see Figure 11) and the spanners are provided with extending pins or plugs 52 and 53 which enter within and are permanently secured to the inner ends of similar forwardly and rearwardly extending tubular arms 54 and 55. The rear end of the rear arm overlies the gear casing in each instance and the forward end of the front arm overlies the cross shaft 39. The shaft 39 is provided between the bearings of the bar 37 with an upstanding bearing block 56 which has the lower end pivotally mounted on the said shaft and the upper end provided with opposing lugs 56' (see Figure 10) and the lugs carry a bolt 57 which is passed through the lower end of an upstanding link 58 which has the upper end thereof pivotally fastened by a cross bolt 59 to the forked forward end of the arm 54.

To the top of each gear casing, I pivotally fasten a sleeve 60 which carries a bolt 61 connecting it to the forked lower end of a link 62 which has the upper end thereof pivotally connected by a bolt 63 to the forked rear end of the tubular arm 55. According to the above description, it will be seen that the gear casings and the front axle 39 are connected to the arms 54 and 55 by flexible joints.

In the open substantially rectangular space appearing between the spanners 50 and 51, I locate a hanger 64 which is pivotally mounted on the shaft 47 and has the lower end thereof terminating in an enlarged base permanently fastened in any suitable manner such as by bolts 65 to a leaf spring 66, the forward and rear ends of the spring being connected by suitable tie members 67 to the overlying body portions of the arms 54 and 55. It will be here particularly observed that the spring underlies the joint connecting the inner ends of the latter arms and that the load on the frame 1 is transmitted through the shaft 47 to the arms 54 and 55 at their point of juncture and that the spring prevents collapse at this point so that the load is transmitted to the front and rear wheels 43 and 23. The spring, however, yieldingly supports the load.

A chain tightener is provided to hold the chain 45 taut under all conditions, that is, whether the machine is advancing or backing up. The tightener and parts associated therewith are now described in detail.

To the spacing arm 33, I secure a pair of supporting bars 68 and 69 which bars extend outwardly and have their spread ends located more or less centrally between the front and rear wheels 43 and 23 and spanning the chain 45. The free ends of the latter bars are connected by a pair of spaced vertical bolts 70 and 71 and these bolts support the chain tightener. Two U-shaped tubular members 72 and 73 are provided, the tubular member 73 having the downwardly extending legs thereof telescopically received within the upwardly extending legs of the member 72 and the upper ends of the member 72 are longitudinally split to permit of them being frictionally clamped to the legs of the member 73 by tightening up bolts 74 carried by lugs provided on the split ends of the member 72.

The rods 70 and 71 pass down slidably through the legs of the tubes in the manner best shown in Figure 4, the tubes actually forming an adjustable carriage mounted on the rods. The tubular members carry opposing upper and lower chain wheels 75 and 76, the upper chain wheel engaging the top side of the chain 45 and the lower chain wheel engaging the under side of said chain. In order to permit of the chain wheels being put in place, I have split the U-shaped tubular members as indicated at 77 so that each tubular member is actually formed from two parts. By releasing the bolt 74, one can readily shift the chain wheels in respect to the chain and when the proper adjustment has been made, the bolts 74 are tightened up.

The device herein shown is particularly adaptable to the well known type of Ford chassis as very little change has to be made in the rear end to permit of the use of my device. Actually all that is necessary to do is to reverse the crown gear as hereinbefore explained and then cut off the flaring heads of each axle housing. This being done, one can then proceed to equip the existing Ford chassis with my device.

An automobile so equipped and assuming of course that runners of any known type have been substituted for the front steering wheels, is particularly advantageous for operating on snow and ice and insures of effective traction due to the endless chains which are in contact with the ground for a considerable area. The construction permits any road wheel to rise or fall without in any way affecting the postion of the other wheel and the springs 66 give the desired resilient riding qualities and prevent collapse at the joint between the arms 54 and 55.

The radius rods function to hold the ends of the rear axle in their proper position but allow of the raising and lowering of the same as required and the spacing arms hold the front wheels in their proper position in respect to the rear wheels while permitting of the raising and lowering of the front wheels to accommodate road conditions. The two to one gear ratio insures of the desirable reduction in the speed at which the rear wheel is driven and the chain 45 insures of the positive driving of the front wheel 43 and further the chain tightener allows of any slack being taken up in the chain from time to time. The front axle can also be properly aligned with the rear axle by adjusting the bolts 36, the bolts being adjusted by first releasing the lock nut, then manipulating the nut 35 to advance or recede the bolt and finally tightening up the lock nut after the required adjustment has been obtained.

What I claim as my invention is:—

1. In an automobile sleigh movable over a surface by crawler traction, the combination with the rear end of an automobile frame, the rear axle housing underlying the rear end of the frame and the rear driving axle contained within the housing, of a gear casing pivotally carried for vertical swinging movement by the outer end of the housing, a rear shaft carried by the casing, driving connections between the shaft and the axle and contained within the casing, a road wheel secured to the shaft, a pair of forwardly and rearwardly extending side arms pivotally connected to the frame for vertical swinging movement, means pivotally connecting the rear end of the rear arm to the gear casing, a forward cross shaft underlying the forward end of the front arm and pivotally connected thereto and provided with a road wheel tracking in advance of the rear wheel, a spring associated with the arms and preventing their collapse under the weight of the load imposed on the frame, a spacing arm extending between the gear casing and the front shaft and pivotally attached to such parts, said arm being adjustable in length, a radius rod preventing rear swing of the rear axle, endless ground engaging chains passing around the rims of the wheels, chain wheels connected to the hub portion of the road wheels and an endless chain connecting the chain wheels.

2. The combination with a rear axle housing and a rear driving axle contained therein, of a gear casing provided with an extending sleeve receiving and rotatably mounted upon the housing, said sleeve being provided with a slot opening to a channel formed on the wall of the sleeve and passing around the housing, a collar mounted on the housing within the channel and securing means approachable through the slot carried by the collar and engaging the housing.

JOSEPH W. ROBERTS.